(12) United States Patent
Doi

(10) Patent No.: US 9,790,344 B2
(45) Date of Patent: Oct. 17, 2017

(54) POLYBUTYLENE TEREPHTHALATE RESIN COMPOSITION AND PELLET THEREOF

(75) Inventor: Kumiko Doi, Shizuoka (JP)

(73) Assignee: WinTech Polymer Ltd., Tokyo (JP)

(*) Notice: Subject to any disclaimer, the term of this patent is extended or adjusted under 35 U.S.C. 154(b) by 87 days.

(21) Appl. No.: 13/992,771

(22) PCT Filed: Nov. 28, 2011

(86) PCT No.: PCT/JP2011/077337
§ 371 (c)(1),
(2), (4) Date: Aug. 7, 2013

(87) PCT Pub. No.: WO2012/081381
PCT Pub. Date: Jun. 21, 2012

(65) Prior Publication Data
US 2013/0309500 A1 Nov. 21, 2013

(30) Foreign Application Priority Data
Dec. 13, 2010 (JP) .................................. 2010-276648

(51) Int. Cl.
*C08K 5/10* (2006.01)
*C08L 67/02* (2006.01)
(Continued)

(52) U.S. Cl.
CPC ............ *C08K 5/10* (2013.01); *C08G 65/3322* (2013.01); *C08L 67/02* (2013.01); *C08L 71/00* (2013.01);
(Continued)

(58) Field of Classification Search
None
See application file for complete search history.

(56) References Cited

U.S. PATENT DOCUMENTS 4,962,145 A * 10/1990 Worschech et al. ........... 524/310
2004/0175641 A1* 9/2004 Nanya et al. .............. 430/109.4
(Continued)

FOREIGN PATENT DOCUMENTS

CN 101855285 A 10/2010
EP 0516351 A2 12/1992
(Continued)

OTHER PUBLICATIONS

English translation of abstract and claim 1 of CN 101855285 A.
(Continued)

*Primary Examiner* — Ronak Patel
(74) *Attorney, Agent, or Firm* — Knobbe, Martens, Olson & Bear, LLP

(57) ABSTRACT

Provided are a polybutylene terephthalate resin composition which is excellent in mold releasability and which can suppress deterioration in molding stability and aggregation of the polybutylene terephthalate resin composition due to blooming of a mold release agent; and a pellet thereof. The polybutylene terephthalate resin composition contains 0.01 to 5.0 parts by mass of (B) a saturated fatty acid ester of a polyglycerol represented by formula (I) described below with respect to 100 parts by mass of (A) a polybutylene terephthalate resin. In formula (I), $R^1$'s each may be the same or different and are $C_{19\text{-}30}$ saturated aliphatic acyl groups, and n is an integer from 1 to 10.

5 Claims, 1 Drawing Sheet

(51) Int. Cl.
 *C08L 71/00* (2006.01)
 *C08G 65/332* (2006.01)
(52) U.S. Cl.
 CPC ..... *C08G 2650/54* (2013.01); *Y10T 428/2998* (2015.01)

(56) References Cited

U.S. PATENT DOCUMENTS

2005/0215750 A1* 9/2005 Koga ............... C08K 5/0008
 528/196
2009/0054572 A1* 2/2009 Kamikawa et al. ......... 524/317
2010/0267860 A1 10/2010 Daute

FOREIGN PATENT DOCUMENTS

| EP | 1050559 A1 | 11/2000 |
|---|---|---|
| EP | 2177567 A1 | 4/2010 |
| JP | H09-053005 A | 2/1997 |
| JP | 2005-097563 A | 4/2005 |
| JP | 2007-046023 A | 2/2007 |
| JP | 2008-303292 A | 12/2008 |
| JP | 2009-298827 A | 12/2009 |
| JP | 2010-144129 A | 7/2010 |
| JP | 2010-189584 A | 9/2010 |

OTHER PUBLICATIONS

Office Action issued to CN Application 201180059417.X mailed Mar. 21, 2014.
Abstract of JP2010-189584A.
Abstract of JP2010-144129A.
Abstract of JP2009-298827A.
Abstract of JP2008-303292A.
Abstract of JP2007-046023A.
Abstract of JP2005-097563A.
Abstract of JPH09-053005A.
Supplementary European search report in European Patent Application No. 11849490.5, dated Sep. 5, 2016.

* cited by examiner

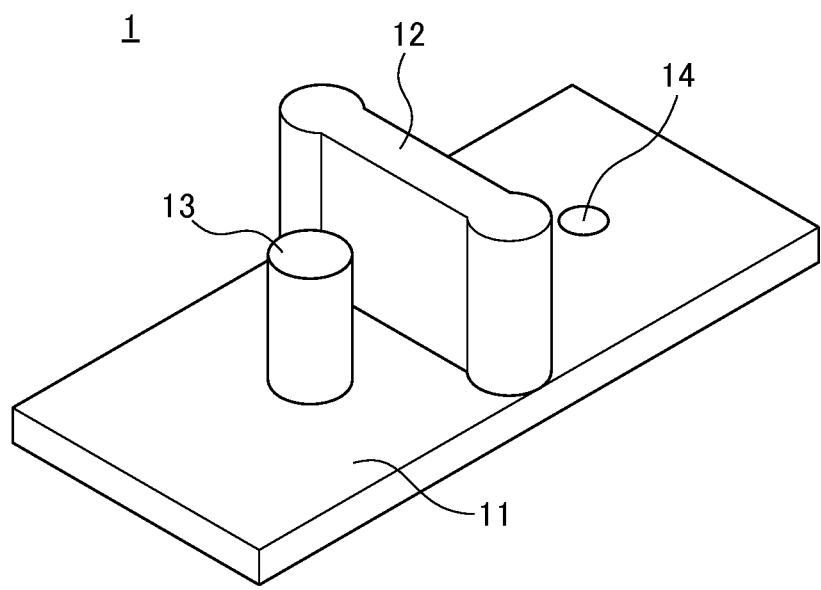

POLYBUTYLENE TEREPHTHALATE RESIN COMPOSITION AND PELLET THEREOF

CROSS-REFERENCE TO RELATED APPLICATIONS

This application is the National Stage of International Application No. PCT/JP2011/077337, filed Nov. 28, 2011, which claims the benefit of Japanese Application No. 2010-276648, filed Dec. 13, 2010, the contents of which are incorporated by reference herein.

TECHNICAL FIELD

The present invention relates to a polybutylene terephthalate resin composition, and a pellet thereof, and further specifically relates to a polybutylene terephthalate resin composition which is excellent in mold releasability and which can suppress deterioration in molding stability and aggregation of the polybutylene terephthalate resin composition due to blooming of a mold release agent; and a pellet thereof.

BACKGROUND ART

A polybutylene terephthalate resin which is a crystalline thermoplastic resin is excellent in moldability, mechanical strength, electrical property, resistance to heat distortion, and resistance to chemicals, and thus is used as a material of various molded products for the broad purpose of automobiles and electric/electronic equipment.

However, in recent years, a molded product has been complicated in its shape, or provided with thin wall parts in its shape as automobile components, electric/electronic equipment, and the like are minimized. At the time of manufacturing a molded product having such shape, deformation, cracking and the like of the molded product may occur due to a fail in release at the time of molding although the polybutylene terephthalate resin is a material excellent in moldability.

Therefore, a polybutylene terephthalate resin composition that is combined with a mold release agent such as paraffin oil, a fatty acid metal soap, a long chain fatty acid ester, or the like is widely used for the purpose of suppressing occurrence of the fail in release.

The polybutylene terephthalate resin composition that is combined with a mold release agent as described above is described in, for example, Patent Document 1. Specifically, it is described in Examples of Patent Document 1 that combination of the polybutylene terephthalate resin with tetraester of diglycerol having a $C_{18}$ saturated acyl group (RIKEMAL S-74 manufactured by Riken Vitamin Co., Ltd.) can lower a release force necessary for releasing the molded product from the mold.

Patent Document 1: Japanese Unexamined Patent Application, Publication No. 2010-189584

DISCLOSURE OF THE INVENTION

Problems to be Solved by the Invention

However, in Examples of Patent Document 1, the release force is evaluated under the conditions where the injection time and the cooling time are fixed, independently of the presence or absence of the deformation of the molded product released from the mold. Therefore, the molded product may be deformed by an external force by an ejector pin even with small release force. Further, considering that manufacture of a molded product having no deformation is demanded in actual molding operation, it cannot be said that the polybutylene terephthalate resin composition described in Examples of Patent Document 1 always improves the mold releasability.

In addition, a polybutylene terephthalate resin composition is generally subjected to dry treatment at a high temperature before the molding, and the polybutylene terephthalate resin composition described in Patent Document 1 has a problem of blooming of the mold release agent on the surface of the polybutylene terephthalate resin composition in the dry process. When such blooming of a mold release agent has occurred, poor feeding of the polybutylene terephthalate resin composition into the screw or sliding of the polybutylene terephthalate resin composition on the screw, and the like easily occur at the time of the molding, and the metering stability is harmed, and thus the polybutylene terephthalate resin composition has a problem in that stable molding over a long time is not possible.

In addition, when the blooming of a mold release agent has occurred, there are problems in that the polybutylene terephthalate resin composition aggregates after the drying, the polybutylene terephthalate resin composition easily adheres to a vessel used in the drying, and a trouble occurs in the operation of supplying the polybutylene terephthalate resin composition after the drying to a molding machine.

The present invention has been made in light of such circumstances, and an object of the present invention is to provide a polybutylene terephthalate resin composition which is excellent in mold releasability and which can suppress deterioration in molding stability and aggregation of the polybutylene terephthalate resin composition due to blooming of a mold release agent; and a pellet thereof.

Means for Solving the Problems

The present inventors have found out that a polybutylene terephthalate resin composition can be obtained, which suppresses blooming of a mold release agent at the time of the drying before the molding, and is excellent in the mold releasability, by means of combination of (B) a saturated fatty acid ester of polyglycerol having a $C_{19-30}$ saturated aliphatic acyl group with respect to (A) a polybutylene terephthalate resin, and arrived at completion of the present invention. Specifically, the present invention provides the followings.

(1) A polybutylene terephthalate resin composition including 0.01 to 5.0 parts by mass of (B) a saturated fatty acid ester of polyglycerol represented by formula (I) described below with respect to 100 parts by mass of (A) a polybutylene terephthalate resin

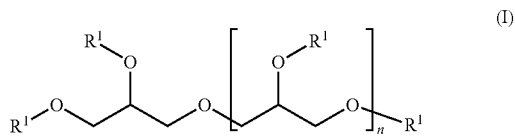

[wherein $R^1$s each may be the same or different and are $C_{19-30}$ saturated aliphatic acyl groups, and n is an integer from 1 to 10.]

(2) The polybutylene terephthalate resin composition described in (1), wherein every $R^1$ in the (B) saturated fatty acid ester of polyglycerol is a $C_{22-28}$ saturated aliphatic acyl group.

(3) The polybutylene terephthalate resin composition described in (2), wherein every $R^1$ in the (B) saturated fatty acid ester of polyglycerol is a behenyl group.

(4) The polybutylene terephthalate resin composition described in any one of (1) to (3), wherein n in the (B) saturated fatty acid ester of polyglycerol is 1 or 2.

(5) A pellet formed of the polybutylene terephthalate resin composition described in any one of (1) to (4).

(6) The pellet described in (5), wherein the shape of the pellet is cylindrical.

(7) The pellet described in (6), which has a cylindrical shape having 1.4 mm to 3.4 mm in diameter of the bottom face and 2.2 mm to 4.2 mm in height.

Effects of the Invention

According to the present invention, provided are a polybutylene terephthalate resin composition which is excellent in mold releasability and which can suppress deterioration in molding stability and aggregation of the polybutylene terephthalate resin composition due to blooming of a mold release agent; and a pellet thereof.

BRIEF DESCRIPTION OF THE DRAWINGS

FIG. 1 is a diagram showing the outline of the shape of a specimen used in the evaluations of the mold releasability in Examples.

EXPLANATION OF REFERENCE NUMERALS

1 Specimen
11 Plate
12 First release-resistive part
13 Second release-resistive part
14 Ejection point

PREFERRED MODE FOR CARRYING OUT THE INVENTION

Hereinafter, embodiments of the present invention will be specifically explained. However, the present invention is not limited to the embodiments below in any way, and may be implemented with suitable modification within the scope of the object of the present invention. Besides, a redundant description will be suitably omitted, but the gist of the invention is not limited.

Hereinafter, a polybutylene terephthalate resin composition, a method of manufacturing the polybutylene terephthalate resin composition, and a pellet of the polybutylene terephthalate resin composition will be explained in order.

[Polybutylene Terephthalate Resin Composition]

The polybutylene terephthalate resin composition of the present invention includes 0.01 to 5.0 parts by mass of (B) a saturated fatty acid ester of polyglycerol represented by formula (I) described below with respect to 100 parts by mass of (A) a polybutylene terephthalate resin. The polybutylene terephthalate resin composition of the present invention may include (C) an additive, (D) a filler, and the like in addition to the (A) polybutylene terephthalate resin and the (B) saturated fatty acid ester of polyglycerol.

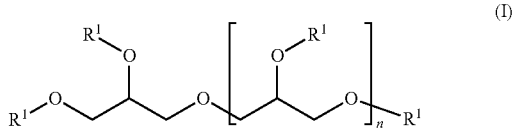

(I)

[In formula (I), $R^1$s each may be the same or different and are $C_{19-30}$ saturated aliphatic acyl groups, and n is an integer from 1 to 10.]

Hereinafter, the components of the polybutylene terephthalate resin composition of the present invention, i.e., the (A) polybutylene terephthalate resin, the (B) saturated fatty acid ester of polyglycerol, the (C) additive, and the (D) filler will be explained specifically.

[(A) Polybutylene Terephthalate Resin]

The (A) polybutylene terephthalate resin is a polybutylene terephthalate-based resin that is obtained by polycondensation of a dicarboxylic acid component including at least terephthalic acid or an ester-forming derivative thereof ($C_{1-6}$ alkyl ester, acid halide and the like), and a glycol component including at least $C_4$ alkylene glycol (1,4-butanediol) or an ester-forming derivative thereof (acetylated product and the like). The (A) polybutylene terephthalate resin is not limited to a homopolybutylene terephthalate resin, and may be a copolymer including 60 mol % or more (particularly 75 mol % to 95 mol %) of a butylene terephthalate unit.

Examples of the dicarboxylic acid component (comonomer component) other than the terephthalic acid and an ester-forming derivative thereof in the (A) polybutylene terephthalate resin used in the present invention include $C_{8-14}$ aromatic dicarboxylic acids such as isophthalic acid, phthalic acid, 2,6-naphthalene dicarboxylic acid and 4,4'-dicarboxydiphenyl ether; $C_{4-16}$ alkane dicarboxylic acids such as succinic acid, adipic acid, azelaic acid and sebacic acid; $C_{5-10}$ cycloalkane dicarboxylic acids such as cyclohexane dicarboxylic acid; ester-forming derivatives of these dicarboxylic acid components ($C_{1-6}$ alkyl ester derivative, acid halide and the like). These dicarboxylic acid components may be used alone or in combination of 2 or more kinds.

Among these dicarboxylic acid components, $C_{8-12}$ aromatic dicarboxylic acids such as isophthalic acid, and $C_{6-12}$ alkane dicarboxylic acids such as adipic acid, azelaic acid and sebacic acid are more preferable.

Examples of the glycol component (comonomer component) other than 1,4-butanediol in the polybutylene terephthalate used in the present invention include $C_{2-10}$ alkylene glycols such as ethylene glycol, propylene glycol, trimethylene glycol, 1,3-butylene glycol, hexamethylene glycol, neopentyl glycol and 1,3-octanediol; polyoxyalkylene glycols such as diethylene glycol, triethylene glycol and dipropylene glycol; alicyclic diols such as cyclohexane dimethanol and hydrogenated bisphenol A; aromatic diols such as bisphenol A and 4,4'-dihydroxybiphenyl; $C_{2-4}$ alkylene oxide adducts of bisphenol A such as 2 mol ethylene oxide-added bisphenol A and 3 mol propylene oxide-added bisphenol A; or ester-forming derivative of these glycols (acetylated products and the like). These glycol components may be used alone or in combination of 2 or more kinds.

Among these glycol components, $C_{2-6}$ alkylene glycols such as ethylene glycol and trimethylene glycol, polyoxyalkylene glycols such as diethylene glycol, or alicyclic diols such as cyclohexane dimethanol, or the like is more preferable.

The intrinsic viscosity of the (A) polybutylene terephthalate resin used in the present invention is not particularly limited within a scope where the object of the present invention is not inhibited. The intrinsic viscosity (IV) of the (A) polybutylene terephthalate resin is preferably 0.65 dL/g to 1.4 dL/g. When a polybutylene terephthalate having such range of the intrinsic viscosity is used, a polybutylene terephthalate resin composition to be obtained is particularly excellent in the moldability. In addition, the intrinsic viscosity may be adjusted by blending polybutylene terephthalate resins having different intrinsic viscosities. For example, by blending polybutylene terephthalate having 1.0 dL/g of the intrinsic viscosity and polybutylene terephthalate having 0.7 dL/g of the intrinsic viscosity, it is possible to prepare polybutylene terephthalate having 0.9 dL/g of the intrinsic viscosity. The intrinsic viscosity (IV) of polybutylene terephthalate can be measured, for example, under a condition of a temperature of 35° C. in o-chlorophenol.

The amount of the terminal carboxyl group of the (A) polybutylene terephthalate resin used in the present invention is not particularly limited as long as the object of the present invention is not inhibited. The amount of the terminal carboxyl group of the polybutylene terephthalate resin used in the present invention is preferably 30 meq/kg or less, and more preferably 25 meq/kg or less. When polybutylene terephthalate having such range of the amount of the terminal carboxyl group is used, a polybutylene terephthalate resin composition to be obtained is hardly subject to lowering of the strength due to hydrolysis under heat and humidity environments.

The (A) polybutylene terephthalate resin in the present invention may be used together with (A') another thermoplastic resin within a scope where the object of the present invention is not inhibited. The use of the (A') other thermoplastic resin when the (A') other thermoplastic resin is used, is not particularly limited within a scope where the object of the present invention is not inhibited, but is typically preferably 100 parts by mass or less, more preferably 80 parts by mass or less, and particularly preferably 50 parts by mass or less with respect to 100 parts by mass of the (A) polybutylene terephthalate resin.

Specific examples of suitable (A') other resin that may be used in the present invention include polyolefins such as polyethylene and polypropylene; aromatic polyesters formed of aromatic dicarboxylic acid such as polyethylene terephthalate, polytrimethylene terephthalate and polyethylene-2,6-naphthalene dicarboxylate, and diol, and the like; aliphatic polyesters such as polylactic acid; polyamide resins such as nylon 46, nylon 6, nylon 66, nylon 610, nylon 612, nylon 11, nylon 12 and MXD nylon; polystyrenes; polyvinyl chloride; polyacrylonitriles; cyclic olefin-based resins such as a cyclic olefin polymer and a cyclic olefin copolymer; acrylic resins; polycarbonate resins; AS resins; ABS resins; acetal resins such as polyoxymethylene; polyphenylene oxides; polyphenylene sulfide resins such as polyphenylene sulfide, polyphenylene sulfide ketone, polybiphenylene sulfide and polyphenylene sulfide sulfone; polysulfone resins such as poly(ether sulfone) and poly(4,4'-bisphenol ether sulfone); polyether ketone resins; polyether ether ketone resins; liquid crystalline polymers; fluorine resins and the like. In addition, these (A') other thermoplastic resins may be used in a mixture of 2 or more kinds.

Besides, when the (A) polybutylene terephthalate resin is used together with the (A') other thermoplastic resin, the use amounts of the (B) saturated fatty acid ester of polyglycerol, the (C) additive, and the (D) filler described below are use amounts with respect to the mass sum of the (A) polybutylene terephthalate resin and the (A') other thermoplastic resin.

[(B) Saturated Fatty Acid Ester of Polyglycerol]

The (B) fatty acid ester of polyglycerol used as a mold release agent in the present invention is not particularly limited as long as it has the structure represented by formula (I) described below. Those synthesized from polyglycerol or a derivative thereof and saturated fatty acid or a derivative thereof, or a commercial product may be used.

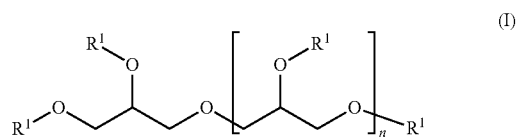

[In formula (I), $R^1$s each may be the same or different and are $C_{19-30}$ saturated aliphatic acyl groups, and n is an integer from 1 to 10]

$R^1$s in formula (I) each may be the same or different and are $C_{19-30}$ saturated aliphatic acyl groups. $R^1$ may be branched within a scope where the object of the present invention is not inhibited, and is more preferably linear. The carbon number of $R^1$ is 19 to 30, particularly preferably 22 to 28 and most preferably 22. If the carbon number of $R^1$ is too small, it is difficult to obtain a polybutylene terephthalate resin composition that is excellent in the mold releasability. If the carbon number of $R^1$ is too large, availability of saturated fatty acid, which is the raw material for the (B) saturated fatty acid ester of polyglycerol, is not easy, or the release effects may be insufficient.

Specific examples of a suitable group as $R^1$ include a nonadecanoyl group, an icosanoyl group (arachidyl group), a heneicosanoyl group, a docosanoyl group (behenyl group), a tricosanoyl group, a tetracosanoyl group (lignocerinyl group), a pentacosanoyl group, a hexacosanoyl group (cerotinyl group), a heptacosanoyl group, an octacosanoyl group (montanyl group), a nonacosanoyl group, a triacontanyl group (melissinyl group), a 17-methyloctadecanoyl group, a 16-methyloctadecanoyl group, a 18-methylnonadecanoyl group, a 17-methylnonadecanoyl group, a 19-methylicosanoyl group, a 18-methylicosanoyl group, a 20-heneicosanoyl group, a 19-methylheneicosanoyl group and the like. Among these groups, the docosanoyl group (behenyl group) is particularly preferable from the points that a polybutylene terephthalate resin composition that is excellent in mold releasability can be obtained, that the problems due to blooming of a mold release agent at the time of the drying before the molding hardly occur, and that availability of saturated fatty acid, which is the raw material of a mold release agent, is easy.

n in formula (I) is an integer from 1 to 10, more preferably 1 to 5, particularly preferably 1 to 4 and most preferably 1 or 2. If n in formula (I) is too large, availability of polyglycerol, which is the raw material of the (B) saturated fatty acid ester of polyglycerol, is not easy, and the amount of the hydroxide groups contained in the (B) saturated fatty acid ester of polyglycerol easily increases as the number of the hydroxide groups of polyglycerol increases, and the physical properties of the polybutylene terephthalate resin composition may be adversely affected.

When the (B) saturated fatty acid ester of polyglycerol is synthesized from polyglycerol or a derivative thereof and saturated fatty acid or a derivative thereof, the method is not particularly limited, and may be selected from known methods for synthesis of ester. Examples of suitable method for synthesis of the (B) saturated fatty acid ester of polyglycerol include the methods 1) to 3) below.

1) Esterification reaction of polyglycerol and saturated fatty acid by an acid catalyst such as sulfuric acid.

2) Reaction of acid halide of saturated fatty acid such as acid chloride, with polyglycerol.

3) Ester exchange reaction of polyglycerol or lower acylated product thereof (for example, acetylated product), and lower alkyl ester of saturated fatty acid (for example, methyl ester).

Specific examples of the saturated fatty acid that may be used as the raw material of the (B) saturated fatty acid ester of polyglycerol include nonadecanoic acid, icosanoic acid (arachidic acid), heneicosanoic acid, docosanoic acid (behenic acid), tricosanoic acid, tetracosanoic acid (lignoceric acid), pentacosanoic acid, hexacosanoic acid (cerotic acid), heptacosanoic acid, octacosanoic acid (montanoic acid), nonacosanoic acid, triacontanoic acid (melissic acid), 17-methyloctadecanoic acid, 16-methyloctadecanoic acid, 18-methylnonadecanoic acid, 17-methylnonadecanoic acid, 19-methylicosanoic acid, 18-methylicosanoic acid, 20-methylheneicosanoic acid, 19-methylheneicosanoic acid and the like.

Suitable examples of the polyglycerol that may be used as the raw material for manufacture of the (B) saturated fatty acid ester of polyglycerol include diglycerol, triglycerol, tetraglycerol, pentaglycerol, hexaglycerol and the like.

The (B) saturated fatty acid ester of polyglycerol used in the present invention is preferably free of a hydroxide group, but may inevitably contain a saturated fatty acid ester of polyglycerol having a hydroxide group depending on the manufacture method or the storage conditions. In such a case, the amount of the hydroxide group contained in the (B) saturated fatty acid ester of polyglycerol is not limited within a scope where the object of the present invention is not inhibited. Specifically, the value of the hydroxide group is preferably 80 or less, more preferably 10 or less, and particularly preferably 5 or less.

The value of the hydroxide groups of the (B) saturated fatty acid ester of polyglycerol is measured in conformity to a method for measuring the hydroxyl value (pyridine-acetic acid anhydride method) of the oil analysis test, which is the standard established by Japan Oil Chemists' Society. The hydroxide group value is obtained by reacting a sample with an acetic acid anhydride liquid (pyridine-acetic acid anhydride solution) on a hot-water bath, and then titrating acetic acid and excess acetic acid with sodium hydroxide.

If the hydroxide group value of the (B) saturated fatty acid ester of polyglycerol is too large, mechanical properties and the like of the resin may be lowered when melting and kneading the (A) polybutylene terephthalate resin and each component contained in the polybutylene terephthalate resin composition, or when molding the polybutylene terephthalate resin composition.

The polybutylene terephthalate resin composition of the present invention may include other mold release agent than the saturated fatty acid ester of polyglycerol within a scope where the object of the present invention is not inhibited as long as it includes the (B) saturated fatty acid ester of polyglycerol in the predetermined range of the amount. The kind of the other mold release agent is not particularly limited within a scope where the object of the present invention is not inhibited, and may be selected from mold release agents that are conventionally used with respect to a polybutylene terephthalate resin. The amount of the other mold release agent is typically preferably 90 mass % or less, more preferably 50 mass % or less, and particularly preferably 10 mass % or less with respect to the mass sum of the (B) saturated fatty acid ester of polyglycerol and the other mold release agent.

Specific examples of suitable other mold release agent that may be used together with the (B) saturated fatty acid ester of polyglycerol include saturated fatty acid ester of polyol that is obtained from polyol such as ethylene glycol, propylene glycol, glycerol, pentaerythritol, sorbitan, or dipentaerythritol, and a $C_{8-30}$ saturated fatty acid; saturated fatty acid ester of polyglycerol that is obtained from polyglycerol of 2 or more condensation number and $C_{8-30}$ saturated fatty acid, and has at least one $C_{8-18}$ saturated aliphatic acyl group; hydrocarbon-based compounds such as a natural paraffin, a synthesized paraffin, Microwax and a polyolefin wax; fatty acid amide-based compounds such as stearic acid amide, palmitic acid amide, methylene bis stearamide and ethylene bis stearamide; alcohol-based compounds such as cetyl alcohol, stearyl alcohol and myristyl alcohol; and polyalkylene glycol compounds such as polyethylene glycol and polypropylene oxide.

The form of the (B) saturated fatty acid ester of polyglycerol is not particularly limited. The (B) saturated fatty acid ester of polyglycerol may be in the solid state or oil state, and may be combined with the polybutylene terephthalate resin as it is, or may be combined with the polybutylene terephthalate resin as a masterbatch in which a thermoplastic resin such as a polybutylene terephthalate resin is used as the matrix.

The use amount of the (B) saturated fatty acid ester of polyglycerol is 0.01 to 5.0 parts by mass, more preferably 0.05 to 4.0 parts by mass, and particularly preferably 0.1 to 3.0 parts by mass with respect to 100 parts by mass of the (A) polybutylene terephthalate resin. If the use amount of the (B) saturated fatty acid ester of polyglycerol is too small, it may be difficult to obtain desired improvement effects with respect to the mold releasability, or suppression of the blooming of a mold release agent. If the use amount of the (B) saturated fatty acid ester of polyglycerol is too large, problems such as mold contamination and unstable metering at the time of injection molding occur easily due to the blooming of a mold release agent. In addition, the mold release agent bloomed on the surface of the molded product may change the electric properties such as the tracking resistance, the arc resistance, the surface resistivity, the volume resistivity and the dielectric breakdown strength, or the contact contamination of the molded product.

[(C) Additive]

The polybutylene terephthalate resin composition of the present invention may include various (C) additives that are conventionally used in a thermoplastic resin composition for the purpose of improving the properties such as the mechanical physical properties, the thermal stability, the flame resistance and the like of the molded product, in addition to the (A) polybutylene terephthalate resin, and the (B) saturated fatty acid ester of polyglycerol within a scope where the object of the present invention is not inhibited. Specific examples of the (C) additive include an elastomer, an anti-oxidant, a heat-resistant stabilizer, an ultraviolet absorber, a plasticizer, a flame retardant, an antistatic agent, a dye, a pigment, a lubricant, a mold release agent, a crystallization promoter, a crystallization-nucleating agent and the like. The use amount of the (C) additive is not particularly limited within a scope where the object of the present invention is not inhibited, and may be suitably selected from the range of ordinary use amount of a desired additive.

[(D) Filler]

The polybutylene terephthalate resin composition of the present invention may be combined with (D) a filler for the purpose of improving the mechanical properties and the like of the molded product, in addition to the (B) saturated fatty acid ester of polyglycerol with respect to the (A) polybutylene terephthalate resin. The kind of the (D) filler used in the present invention is not particularly limited within a scope where the object of the present invention is not inhibited, and various fillers that are conventionally used as a filler of a polymer material may be used, and any inorganic filler or organic filler may be used. In addition, the shape of the (D) filler used in the present invention is not limited within a scope where the object of the present invention is not inhibited, and a fibrous filler, a powdery filler, and a tabular filler may all be suitably used.

Examples of the suitable fibrous filler used in the present invention include inorganic fibrous substances such as a glass fiber, an asbestos fiber, a silica fiber, a silica/alumina fiber, an alumina fiber, a zirconia fiber, a boron nitride fiber, a silicon nitride fiber, a boron fiber, a potassium titanate fiber, and further a fibrous substance of a metal, e.g. stainless steel, aluminum, titanium, copper, brass and the like.

Examples of suitable powdery filler used in the present invention include carbon black, graphite; silicates such as silica, quartz powder, glass bead, milled glass fiber, glass balloon, glass powder, calcium silicate, aluminum silicate, kaolin, talc, clay, diatomaceous earth and wollastonite; metal oxides such as iron oxide, titanium oxide, zinc oxide, antimony trioxide and alumina; metal carbonates such as calcium carbonate and magnesium carbonate; metal sulfates such as calcium sulfate and barium sulfate; other ferrites, silicon carbides, silicon nitrides, boron nitrides, various metal powders and the like. In addition, examples of suitable tabular fillers include mica, glass flake, various metal foils and the like.

Among these (D) fillers, the glass fiber is particularly preferably used in terms of excellent balance between the cost and the physical properties of the obtained polybutylene terephthalate resin composition.

As the glass fiber, any known glass fiber is preferably used, and the glass fiber does not depend on the diameter of the glass fiber, the shape of the cross section such as the cylinder, the cocoon-shape cross section and the elliptical cross section, or the length when used in the manufacture of the chopped strand, roving and the like, or the method of the glass cut. The kind of glass, which is the raw material of the glass fiber in the present invention, is not particularly limited, but E glass, or corrosion resistant glass including the zirconium element in the composition is preferably used in terms of the quality.

In addition, for the purpose of improving the interfacial properties of the (D) filler and the resin matrix including the (A) polybutylene terephthalate resin, surface-treated filler with an organic processing agent such as a silane compound and an epoxy compound is preferably used. As the silane compound or the epoxy compound used in such filler, any known one may be preferably used, and is not dependent on the kind of the silane compound or the epoxy compound used in the surface treatment of the filler in the present invention.

The use amount of the (D) filler is not limited within a scope where the object of the present invention is not inhibited, but is typically preferably 5 to 200 parts by mass, more preferably 10 to 150 parts by mass, and particularly preferably 15 to 100 parts by mass with respect to 100 parts by mass of the (A) polybutylene terephthalate resin. When the use amount of the (D) filler is too large, the fluidity of the resin composition at the time of the molding may be harmed.

[Method of Manufacturing Polybutylene Terephthalate Resin Composition]

The method of manufacturing the polybutylene terephthalate resin in the present invention is not particularly limited as long as the (A) polybutylene terephthalate resin and the (B) saturated fatty acid ester of polyglycerol can be uniformly mixed, and may be suitably selected from conventionally known methods of manufacturing a thermoplastic resin composition.

Examples of a suitable method of manufacturing the polybutylene terephthalate resin composition of the present invention include a method in which each component is melted, kneaded and extruded using a melting and kneading equipment such as a mono-axial or bi-axial extruder, and then the polybutylene terephthalate resin composition is processed to a desired form such as a powder, a flake and a pellet.

[Pellet of Polybutylene Terephthalate Resin Composition]

The form of the polybutylene terephthalate resin composition of the present invention is not particularly limited, but when the polybutylene terephthalate resin composition is rendered to have the form of the pellet, the influence of the blooming of a mold release agent from the drying of the resin before the molding can be particularly lowered.

Besides, the "pellet" in the present invention means a massive substance of a uniform shape formed of the polybutylene terephthalate resin composition, which is used in a molding process such as injection molding, extrusion molding and blow molding. Herein, the uniform shape of the pellet is not necessary to be geometrically uniform completely, and is sufficient if it is recognized as a roughly uniform shape in visual observation. Besides, a mixture of the pellets, in which several kinds of the pellets of the uniform shape are mixed, is encompassed in the "pellet" of the present invention. The pellet in the present invention may be obtained by processing the polybutylene terephthalate resin composition in the melting state to a desired shape, or by compressing the powders of the polybutylene terephthalate resin composition and processing to a desired shape, like, for example, a tablet confectionery.

The pellet of the polybutylene terephthalate resin composition of the present invention has little blooming of the mold release agent on the surface of the pellet after the drying of the resin before the molding, and thus poor feeding of the pellet to the screw of the molding machine, or sliding of the pellet on the screw of the molding machine hardly occurs. Therefore, by using the polybutylene terephthalate resin composition of the present invention as a molding material, it is possible to stabilize the metering at the time of the molding, and thus implement the molding operation stably for a long time, and reduce variation of the dimension or mechanical properties of the product.

In addition, with the pellet of the polybutylene terephthalate resin composition of the present invention, it is possible to suppress aggregation of the pellets to each other after the drying of the resin before the molding, or adhesion of the pellet onto the vessel used in the drying of the pellet, resulting in very easy supply of the pellet to a molding machine.

When the polybutylene terephthalate resin composition is used as a pellet in the present invention, the shape of the pellet is not particularly limited as long as it does not make a great trouble in the molding operation. Examples of the shape of suitable pellets include a cylinder, a sphere, an ellipsoid, a cube, a cuboid and the like. Among these shapes, a cylinder is more preferable from the points of easy manufacture of the pellet and excellent handling property at the time of the molding. Besides, these shapes of the pellet are not necessary to be a geometrically strict cylinder or sphere, and encompass shapes that may be roughly judged as a cylinder, sphere and the like, visually.

Examples of a suitable method for manufacturing the cylindrical pellet include a method in which the melted and kneaded polybutylene terephthalate resin composition is extruded with a mono-axial or bi-axial extruder as a strand through the dies provided with circular discharge apertures, and then the strand is cooled and cut to a desired length. Besides, the diameter of the discharge aperture is selected depending on the melting and kneading conditions so that a pellet of a desired diameter can be obtained.

When the pellet of the polybutylene terephthalate resin composition in the present invention is cylindrical, the diameter of the bottom face is preferably 1.4 mm to 3.4 mm, and more preferably 1.5 mm to 3.2 mm. In addition, the height is preferably 2.2 mm to 4.2 mm, and more preferably 2.5 mm to 3.8 mm.

When the diameter of the bottom face and the height of the pellet are too small with respect to the cylindrical pellet, the surface area per unit weight of the pellet increases, and thus the mold release agent may be easily bloomed on the surface of the pellet. In addition, when the diameter of the bottom face and the height of the pellet are too large, the metering property is deteriorated such as longer metering time at the time of the injection molding, variation of the metering time, no metering and the like. The deterioration of the metering property causes problems such as longer molding time, impossible continuous molding, uneven filling of every shot, and the quality of the molded product may be deteriorated.

According to the polybutylene terephthalate resin composition of the present invention, and the pellet of the polybutylene terephthalate resin composition explained above, it is possible to suppress the blooming of a mold release agent onto the surface of the polybutylene terephthalate resin at the time of the drying before the molding.

Therefore, according to the polybutylene terephthalate resin composition of the present invention, and the pellet of the polybutylene terephthalate resin composition, it is possible to suppress occurrence of poor feeding of the resin to the screw of the molding machine or sliding of the resin on the screw due to the blooming of a mold release agent, and allow stable molding.

Particularly, when the polybutylene terephthalate resin composition of the present invention is a pellet, aggregation of the pellets from the drying before the molding hardly occurs, and supply of the pellets to the molding machine becomes easy, and thus, it is possible to greatly improve the efficiency of the molding operation in addition to the molding stability.

In addition, the polybutylene terephthalate resin composition of the present invention, and the pellet of the polybutylene terephthalate resin composition are excellent in the mold releasability, and can shorten the release time of the molded product, and thus can lower the manufacture cost of the molded product by the shortening of the molding cycle.

EXAMPLES

Hereinafter, the present invention will be further specifically explained with Examples, but the present invention is not limited to these Examples.

The (A) polybutylene terephthalate resin, the (B) mold release agent (the saturated fatty acid ester of polyglycerol represented by formula (I)), the (B') mold release agent other than the polyglycerol saturated fatty acid ester represented by formula (I), and the (C) additive, which are used as the materials of the polybutylene terephthalate resin composition in Examples and Comparative Examples, will be described below.

[(A) Polybutylene Terephthalate Resin]

A-1: Polybutylene terephthalate resin having an intrinsic viscosity of 0.88 (500FP manufactured by WinTech Polymer Ltd.)

[(B) Mold Release Agent (Saturated Fatty Acid Ester of Polyglycerol Represented by Formula (I))]

B-1: Diglycerol tetrabehenate (RIKEMAL B74 manufactured by Riken Vitamin Co., Ltd.)

B-2: Triglycerol pentabehenate (Poem TR-FB manufactured by Riken Vitamin Co., Ltd.)

[(B') Mold Release Agent Other than Saturated Fatty Acid Ester Of Polyglycerol Represented by Formula (I)]

B'-1: Diglycerol tetrastearate (RIKEMAL S-74 manufactured by Riken Vitamin Co., Ltd.)

B'-2: Ethylene glycol dimontanate (Luzawax EP manufactured by Clariant (Japan) K.K.)

B'-3: Propylene glycol dibehenate

B'-4: Behenic acid behenyl ester (Unistar M2222-SL manufactured by NIPPON YUKA KOGYO CO., LTD.)

B'-5: Dipentaerythritol hexastearate

B'-6: Glycerin tristearate (Poem S-95 manufactured by Riken Vitamin Co., Ltd.)

B'-7: Ethylene glycol distearate (Unistar E-275 manufactured by NIPPON YUKA KOGYO CO., LTD.)

[(C) Additive]

C-1: Pentaerythritol tetrakis[3-(3,5-di-tert-butyl-4-hydroxyphenyl) propionate] (IRGANOX1010 manufactured by Chiba Japan)

Reference Examples

The diglycerol tetrabehenate (B-1) was prepared in accordance with the following formulations.

2 mol of behenic acid was dissolved in 1.5 l of chloroform, and 5 mol of thionyl chloride was added thereto, and stirring was performed at room temperature for 4 hours. Then, the reaction liquid was concentrated under reduced pressure, and excess thionyl chloride was distilled together with chloroform. To the obtained residue, 750 ml of chloroform was added, to obtain a chloroform solution of behenic acid chloride.

To a solution including 0.2 mol of diglycerol and 500 ml of triethyl amine, the obtained chloroform solution of behenic acid chloride was dropped, and then reaction was performed for 12 hours at room temperature. The reaction liquid was concentrated under reduced pressure, and purified by silica gel chromatography, to obtain 0.1 mol of diglycerol tetrabehenate.

The mold release agents of B'-3 and B'-5 were prepared similarly to diglycerol tetrabehenate except that the use amount of the raw material polyol was changed depending on the number of the hydroxide group.

Example 1

The (A) polybutylene terephthalate resin A-1, the (B) mold release agent B-1 (the saturated fatty acid ester of polyglycerol) and the (C) additive C-1 in the ratio shown in Table 1 were melted and kneaded under the conditions described below using a bi-axial extruder (TEX-30 manufactured by JSW) to prepare a polybutylene terephthalate resin composition. The melted and kneaded polybutylene terephthalate resin composition was discharged in a strand shape from the dies of the tip of the bi-axial extruder provided with a circular discharge aperture having 4 mm in pore diameter. The strand of the polybutylene terephthalate resin composition was cooled, and then the strand was cut to 3 mm length, to obtain a pellet of the polybutylene terephthalate resin composition. Using the obtained polybutylene terephthalate resin composition, the mold releasability, the blooming property of the mold release agent, and the metering stability at the time of the molding were evaluated in accordance with the methods described below. In addition, the melting point of the mold release agent was evaluated in accordance with the methods described below. The evaluation results for the melting point of the mold release agent, the mold releasability, the blooming property, and the metering stability are described in Table 1.

Melting and Kneading Condition
    Cylinder temperature: 260° C.
    Screw rotation number: 130 rpm
    Extruding amount: 12 kg/hr Measurement of Melting Point The melting point of the mold release agent described in Table 1 was measured based on JIS K0064 (1992).

Evaluation of Mold Releasability

Evaluation of the mold releasability was performed using a polybutylene terephthalate resin composition that had been kept for 3 hours in a constant temperature incubator of 140° C. The evaluation of the mold releasability was performed by molding a specimen 1 for evaluation of the mold releasability, which consisted of a plate 11, a first release-resistive part 12, and a cylindrical second release-resistive part 13 as shown in FIG. 1, using an injection molding machine (EC30 manufactured by Toshiba Machine Co., Ltd.) under the conditions below. Release of the specimen 1 was performed by poking the ejection point 14 on the plate 11 with an ejector pin. The dimensions of the plate 11 were 30 mm in longer side, 15 mm in shorter side, and 1 mm in thickness; the dimensions of the first release-resistive part 12 were 10 mm in height, 15 mm in width, 2 mm in thickness of the center thin wall part, and 3 mm in thickness of the thick parts of both ends; and the dimensions of the second release-resistive part 13 were 3 mm in diameter of the bottom face, and 7 mm in height. The shortest cooling time when the ejection mark is not formed by the ejector pin at the time of the release, was measured under 50 MPa of the dwelling pressure, and the mold releasability was evaluated. Those not released with 60 seconds of the cooling time was described as x. As the shortest cooling time is shorter, it means that the mold releasability is excellent.

(Conditions for Injection Molding)
    Cylinder temperature: 250° C.
    Mold temperature: 60° C.
    Injection speed: 20 mm/seconds Blooming Property The pellet of the polybutylene terephthalate resin composition was fully filled with leveling in a glass beaker having 43 mm in internal diameter of the bottom face and 50 ml of the capacity, and the beaker was kept in a constant temperature incubator for 3 hours at 140° C. Then, the beaker was taken out from the constant temperature incubator, and stood in the room, whereby to cool the pellet at room temperature. Then, the beaker was put on a smooth horizontal plane with the opening downward, and the beaker was calmly lifted up, and the state of the pellet dispersion was visually checked. The pellet state after lifting up the beaker was visually observed, and the blooming property of the mold release agent was evaluated in 4 stages of ++, +, −, and — on the standards described below.

(Evaluation Standards for Blooming Property)

++: Pellet flows to be conically deposited, and aggregation of the pellet is not nearly seen.

+: Pellet flows to be conically deposited, but aggregation of a portion of the pellet is seen.

−: Aggregation of half or more of the pellet is seen.

—: Adhesion of the pellet to the beaker in the state of aggregation is seen, and the beaker cannot be removed.

Evaluation for Metering Stability

The pellet of the polybutylene terephthalate resin composition was dried in a constant temperature incubator at 140° C. for 3 hours. Then, using the pellet after the drying, tabular molded products of 60 mm×50 mm×2 mm were continuously molded by an injection molding machine (EC40 manufactured by Toshiba Machine Co., Ltd.). The metering stability was evaluated with the average metering time per one shot at the time of molding 100 shots from 21th shot to 120th shot after molding 20 shots from the molding initiation.

Examples 2 to 4 and Comparative Examples 1 to 9

Pellets of the polybutylene terephthalate resin composition were manufactured similarly to Example 1 except that the kind of the mold release agent was changed to the (B) saturated fatty acid ester of polyglycerol, or the (B') other mold release agent described in Table 1, and the use amount of a mold release agent was modified to the amount described in Table 1. The mold releasability, the blooming property, and the metering stability of the pellets of the polybutylene terephthalate resin compositions obtained in Examples 2 to 4, and Comparative Examples 1 to 9 were evaluated similarly to Example 1. The evaluation results for the mold releasability, the blooming property, and the metering stability are described in Table 1.

TABLE 1

|  | Example | | | | Comparative Example | | | | | | | | |
| --- | --- | --- | --- | --- | --- | --- | --- | --- | --- | --- | --- | --- | --- |
|  | 1 | 2 | 3 | 4 | 1 | 2 | 3 | 4 | 5 | 6 | 7 | 8 | 9 |
| (A) | | | | | | | | | | | | | |
| A-1 | 100 | 100 | 100 | 100 | 100 | 100 | 100 | 100 | 100 | 100 | 100 | 100 | 100 |
| (B) | | | | | | | | | | | | | |
| B-1 | 0.3 | 0.5 | — | — | — | — | — | — | — | — | — | — | — |
| B-2 | — | — | 0.3 | 0.5 | — | — | — | — | — | — | — | — | — |
| (B') | | | | | | | | | | | | | |
| B'-1 | — | — | — | — | 0.3 | 0.5 | — | — | — | — | — | — | — |
| B'-2 | — | — | — | — | — | — | 0.3 | — | — | — | — | — | — |
| B'-3 | — | — | — | — | — | — | — | 0.3 | — | — | — | — | — |
| B'-4 | — | — | — | — | — | — | — | — | 0.3 | — | — | — | — |
| B'-5 | — | — | — | — | — | — | — | — | — | 0.3 | — | — | — |
| B'-6 | — | — | — | — | — | — | — | — | — | — | 0.3 | — | — |
| B'-7 | — | — | — | — | — | — | — | — | — | — | — | 0.3 | — |

TABLE 1-continued

|  | Example | | | | Comparative Example | | | | | | | | |
|---|---|---|---|---|---|---|---|---|---|---|---|---|---|
|  | 1 | 2 | 3 | 4 | 1 | 2 | 3 | 4 | 5 | 6 | 7 | 8 | 9 |
| (C) | | | | | | | | | | | | | |
| C-1 | 0.3 | 0.3 | 0.3 | 0.3 | 0.3 | 0.3 | 0.3 | 0.3 | 0.3 | 0.3 | 0.3 | 0.3 | 0.3 |
| Properties of mold release agent | | | | | | | | | | | | | |
| Carbon number of acyl group | 22 | | 22 | | 18 | 28 | 22 | 22 | 18 | 18 | 18 | — | |
| Main skeleton | DG | | TG | | DG | EG | PG | BA | DPE | GL | EG | — | |
| Molecular weight | 1456 | | 1853 | | 1232 | 876 | 721 | 649 | 1853 | 892 | 595 | — | |
| Melting point (° C.) | 70 | | 71 | | 54 | 80 | 70 | 70 | 67 | 56 | 63 | — | |
| Mold Releasability (seconds) | 9 | 8 | 8 | 9 | X | 12 | 9 | 5 | 5 | X | X | X | X |
| Blooming property | ++ | ++ | ++ | ++ | —— | —— | — | —— | —— | + | — | + | ++ |
| Average metering time | 24 | 26 | 12 | 15 | 34 | 39 | 28 | 57 | 64 | 20 | 30 | 26 | — |

In Table 1, the amount of each component of (A), (B), (B'), and (C) is represented in part(s) by mass.

In addition, the symbols of the main skeletons of the mold release agents in the Table mean that the mold release agent has the main skeletons derived from the alcohol or polyol described below.

DG: Diglycerol
TG: Triglycerol
EG: Ethylene glycol
PG: Propylene glycol
BA: Behenyl alcohol
DPE: Dipentaerythritol
GL: Glycerin Further, the molecular weights of the mold release agents in the Table are those obtained by rounding the molecular weights off to the closest whole number.

From comparison of Examples 1 to 4 with Comparative Examples 1 and 2, it is understood that a polybutylene terephthalate resin composition that is excellent in the mold releasability is not obtained, and the blooming of the mold release agent also cannot be improved when the carbon number of the acyl group possessed by the mold release agent is 18 or less even if the main skeleton of the mold release agent is derived from polyglycerol.

From comparison of Examples 1 to 4 with Comparative Examples 3 to 5, it is understood that a polybutylene terephthalate resin composition that is excellent in the mold releasability is obtained, but the blooming of a mold release agent cannot be improved if the carbon number of the acyl group possessed by the mold release agent is 19 or more when the main skeleton of the mold release agent is derived from other polyol or alcohol other than polyglycerol.

In Comparative Example 6, dipentaerythritol tetrastearate having similar molecular weight and melting point to triglycerol pentabehenate (Examples 3 and 4, B-2) was used, but a polybutylene terephthalate resin composition that is excellent in the mold releasability was not obtained. In addition, slight aggregation was observed in the pellet after the drying, and the blooming property was not sufficiently improved.

From Comparative Examples 7 and 8, it is understood that a polybutylene terephthalate resin composition that is excellent in the mold releasability cannot be obtained even though the blooming property of the mold release agent is somewhat improved when the mold release agent does not have the skeleton derived from polyglycerol, and the carbon number of the acyl group possessed by the mold release agent is 18 or less.

From Comparative Example 9, it is understood that the blooming is not seen, but sufficient mold releasability is absent when the mold release agent is not added. With respect to the metering stability, the metering was not stable, and continuous molding was impossible, and thus the measurement was stopped.

As the cause for aggregation of the polybutylene terephthalate resin composition due to the blooming of the mold release agent, it is considered that the mold release agent is melted in the polybutylene terephthalate resin composition when the melting point of the mold release agent is low, and is easily bloomed.

When the mold release agent having low melting point is used in Comparative Example 1 and 2, aggregation of the polybutylene terephthalate resin composition is observed.

In Comparative Examples 3, 5 and 7, the mold release agents having equal to or higher melting point than the mold release agents of Examples are used, but aggregation of the polybutylene terephthalate resin composition after the drying is observed.

Further, between Comparative Examples 1 and 5 and between Comparative Examples 6 and 8, the molecular weights of the mold release agents are different by two to three times. However, in Comparative Examples 1 and 5, remarkable aggregation of the polybutylene terephthalate resin composition after the drying is observed, whereas in Comparative Examples 6 and 8, only slight aggregation of the polybutylene terephthalate resin composition after the drying is observed. In other words, according to the results of these Comparative Examples, it is understood that the molecular weight of the mold release agent has no great influence on the blooming property.

As described above, according to the results of Examples and Comparative Examples, it is understood that the effects of the polybutylene terephthalate resin according to the invention to improve the mold releasability, blooming property, and the metering stability at the time of the molding, are not expected from the melting point, the molecular weight, and the like of the mold release agent, and are caused by the features of the structure of the mold release agent such as the skeleton derived from polyglycerol and an acyl group of 19 or more of the carbon number.

The invention claimed is:

1. A polybutylene terephthalate resin composition comprising 0.01 to 5.0 parts by mass of a saturated fatty acid ester of polyglycerol represented by formula (I) below with respect to 100 parts by mass of a polybutylene terephthalate resin, wherein the amount of a hydroxide group included in the saturated fatty acid ester of polyglycerol has a hydroxide group value of less than 5, and an average metering time measured by the following evaluation method is no greater than 26 seconds:

when a pellet of the polybutylene terephthalate resin composition is dried at 140° C. for 3 hours and then using the pellet after the drying, tabular molded products of 60 mm×50 mm×2 mm are continuously molded by an injection molding machine, an average metering time per one shot at the time of molding 100 shots from 21th shot to 120th shot from the molding initiation is measured,

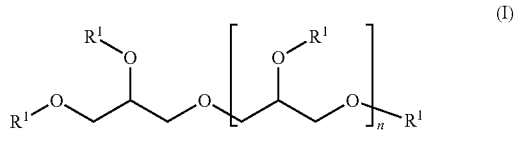

wherein every $R^1$ is a behenyl group and n is an integer from 1 to 10.

2. The polybutylene terephthalate resin composition according to claim 1, wherein n in the saturated fatty acid ester of polyglycerol is 1 or 2.

3. A pellet formed of the polybutylene terephthalate resin composition according to claim 1.

4. The pellet according to claim 3, wherein the shape of the pellet is cylindrical.

5. The pellet according to claim 4, which has a cylindrical shape having 1.4 mm to 3.4 mm in diameter of the bottom face and 2.2 mm to 4.2 mm in height.

* * * * *